United States Patent
Sonoda et al.

(10) Patent No.: US 10,281,771 B2
(45) Date of Patent: May 7, 2019

(54) LIQUID CRYSTAL DISPLAY DEVICE AND MANUFACTURING METHOD OF THE SAME

(71) Applicant: Japan Display Inc., Minato-ku (JP)

(72) Inventors: Hidehiro Sonoda, Minato-ku (JP); Noboru Kunimatsu, Minato-ku (JP); Takenori Hirota, Minato-ku (JP); Yosuke Hyodo, Minato-ku (JP); Yasuo Imanishi, Minato-ku (JP); Yasushi Tomioka, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 146 days.

(21) Appl. No.: 15/144,973

(22) Filed: May 3, 2016

(65) Prior Publication Data

US 2016/0357040 A1 Dec. 8, 2016

(30) Foreign Application Priority Data

Jun. 3, 2015 (JP) .................................. 2015-112898

(51) Int. Cl.
G02F 1/1337 (2006.01)
G02F 1/13363 (2006.01)
G02F 1/1339 (2006.01)

(52) U.S. Cl.
CPC ........ *G02F 1/1339* (2013.01); *G02F 1/13363* (2013.01); *G02F 1/133788* (2013.01)

(58) Field of Classification Search
CPC ............. G02F 1/1339; G02F 1/133788; G02F 1/1337; G02F 1/13378; G02F 1/13394;

(Continued)

(56) References Cited

U.S. PATENT DOCUMENTS

2006/0061719 A1 3/2006 Tomioka et al.
2008/0309861 A1* 12/2008 Seki .................. G02F 1/133555
349/117

(Continued)

FOREIGN PATENT DOCUMENTS

JP 2004-206091 7/2004
JP 2010-096795 A 4/2010

(Continued)

OTHER PUBLICATIONS

Office Action dated Nov. 27, 2018, in Japanese Patent Application No. 2015-112898, filed Jun. 3, 2015, w/English-language Translation, citing documents AO, AP, AQ, and AR.

*Primary Examiner* — Angela K Davison
(74) *Attorney, Agent, or Firm* — Oblon, McClelland, Maier & Neustadt, L.L.P.

(57) ABSTRACT

In a liquid crystal display device having an alignment film subjected to an optical alignment process, the frame area can be reduced while maintaining the reliability of the sealing portion. To achieve this, in the display area, the alignment process is performed with UV light on the alignment film, to form an area in which the alignment film is not formed in the opposing first and second sides, and to form an area in which the amount of UV light irradiation on the alignment film is one fourth or less of the display area in the opposing third and fourth sides. In the first and second sides, the sealing material overlaps the area in which the alignment film is not formed. In the third and fourth sides, the sealing material overlaps the area in which the amount of UV light irradiation is one fourth or less of the display area.

10 Claims, 14 Drawing Sheets

(58) Field of Classification Search
CPC ..... G02F 1/13363; G02F 2001/133635; G02F 2413/02
See application file for complete search history.

(56) References Cited

U.S. PATENT DOCUMENTS

2010/0014033 A1\* 1/2010 Kawasaki .............. G02B 5/201
349/117
2011/0176097 A1 7/2011 Shiromoto et al.

FOREIGN PATENT DOCUMENTS

| JP | 2011-145535 | 7/2011 |
|---|---|---|
| JP | 2015-040880 A | 3/2015 |
| WO | WO 2008/102640 A1 | 8/2008 |
| WO | WO 2009/037889 A1 | 3/2009 |

\* cited by examiner

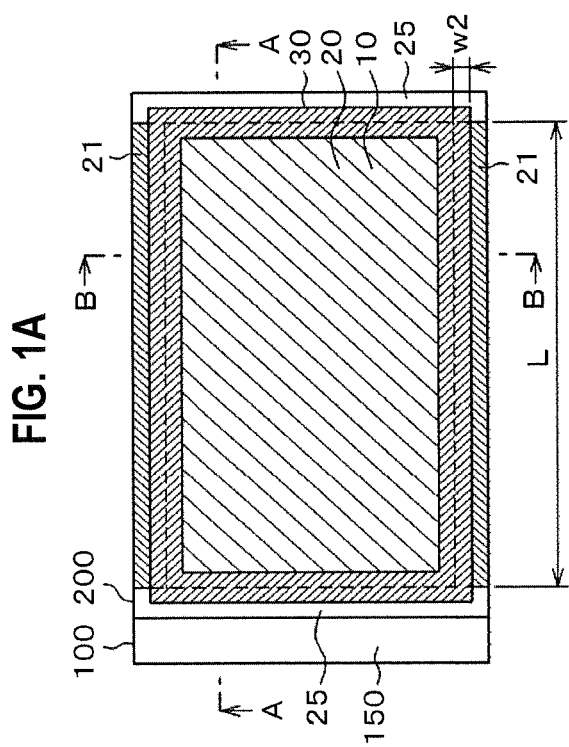
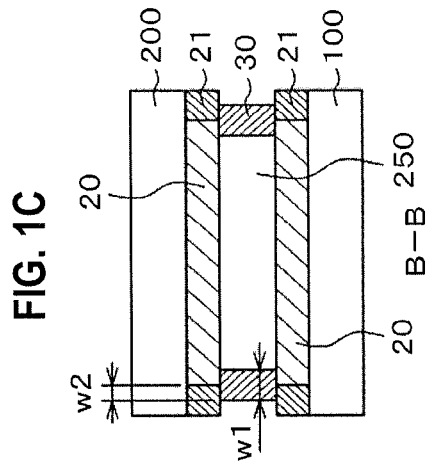
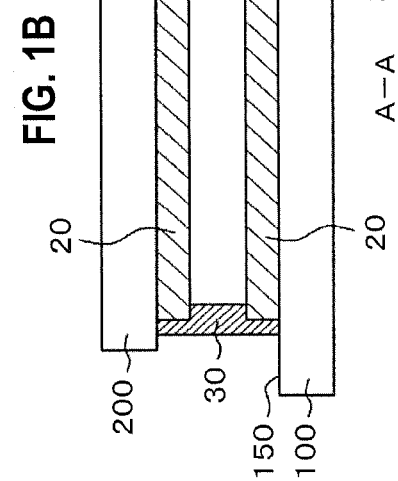

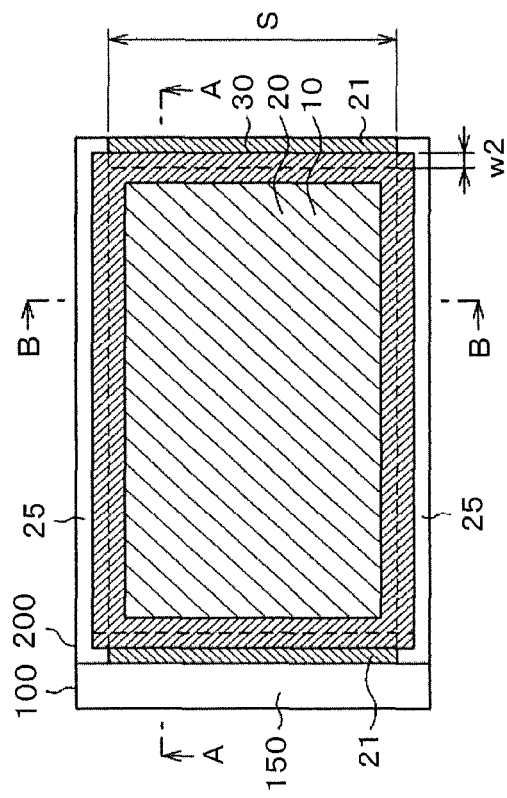
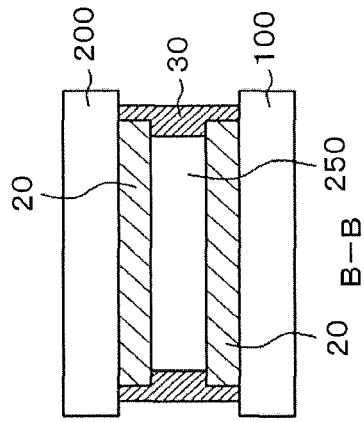
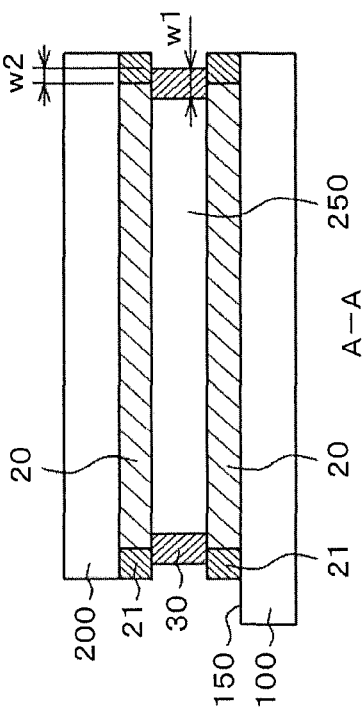

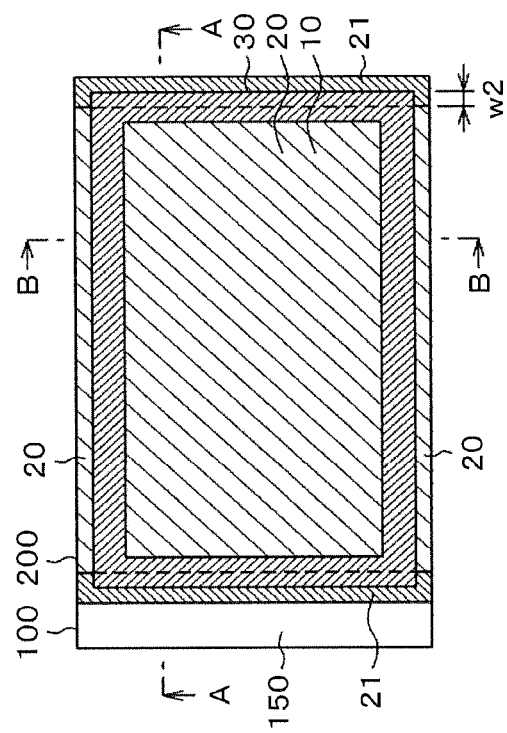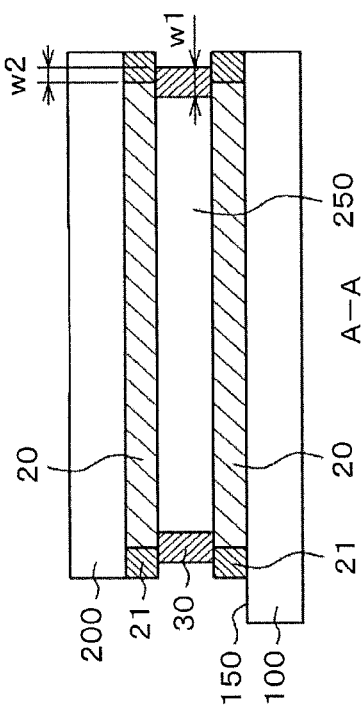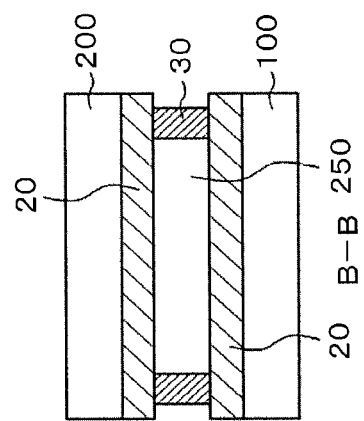

FIG. 14
BACKGROUND ART
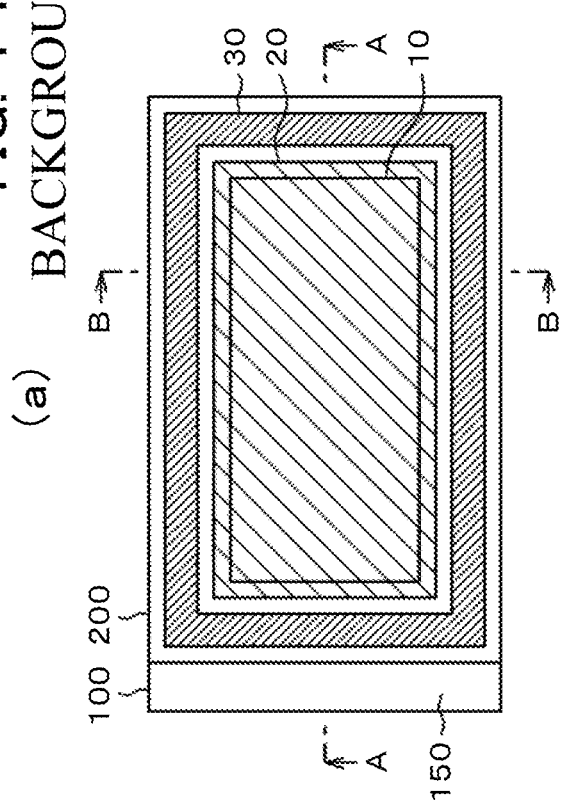
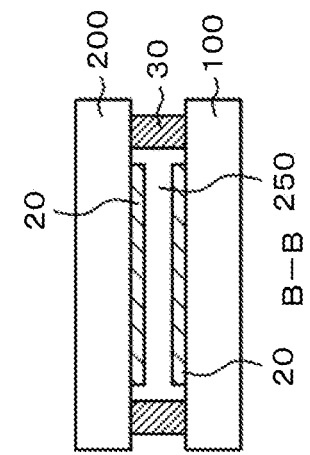
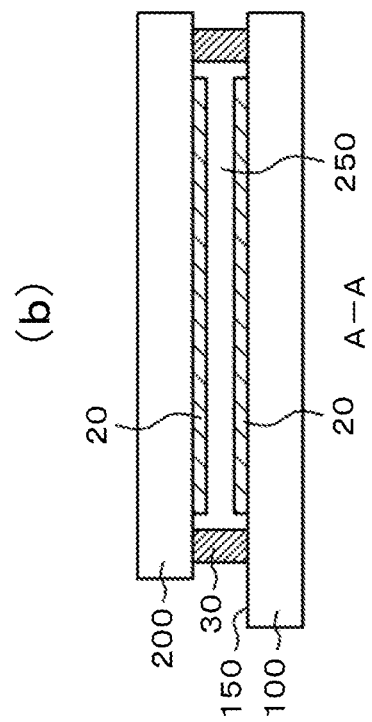

FIG. 15
BACKGROUND ART
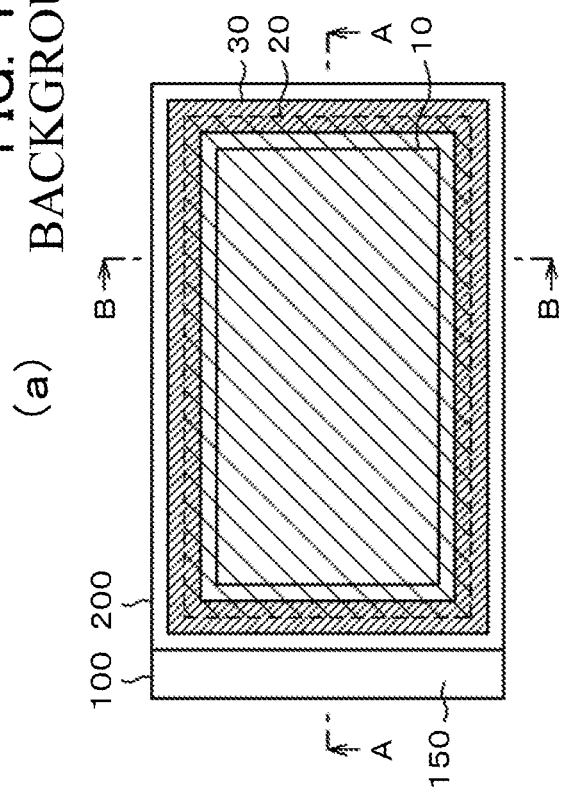
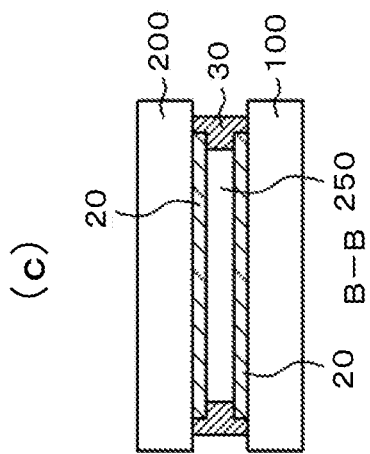
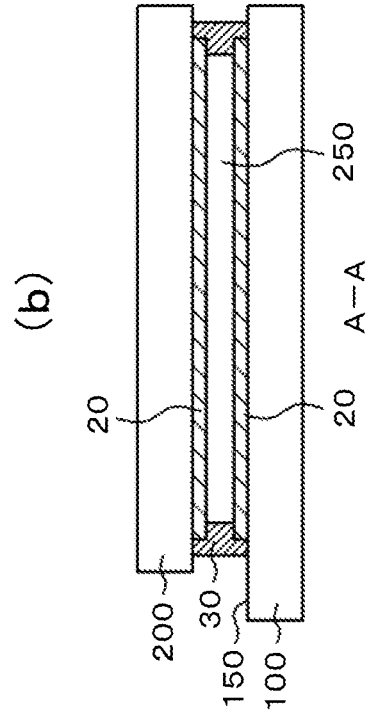

LIQUID CRYSTAL DISPLAY DEVICE AND MANUFACTURING METHOD OF THE SAME

CLAIM OF PRIORITY

The present application claims priority from Japanese Patent Application JP 2015-112898 filed on Jun. 3, 2015, the content of which is hereby incorporated by reference into this application.

BACKGROUND OD THE INVENTION (1) Field of the Invention

The present invention relates to a display device, and more particularly, to a liquid crystal display device that can be formed to have an increased display area relative to a predetermined profile, namely, a so-called narrow frame.

(2) Description of the Related Art

In a liquid crystal display device, there is a TFT substrate in which pixels each having a pixel electrode, a thin film transistor (TFT), and the like are arranged in a matrix form. There is also a counter substrate opposite the TFT substrate, in which color filters, and the like, are formed at positions corresponding to the pixel electrodes of the TFT substrate. Further, a liquid crystal is interposed between the TFT substrate and the counter substrate. Then, the liquid crystal display device forms an image by controlling the transmittance of light for each pixel by the liquid crystal molecules.

The liquid crystal display device is flat and lightweight and its application has expanded in various fields. Small liquid crystal display devices are widely used in mobile phones, digital still cameras (DSC), or other portable devices. There is a strong demand for the small liquid crystal display device to increase the display area while maintaining a small profile. In order to meet this demand, the width from the end portion of the display area to the end portion of the liquid crystal display device is reduced. In other words, it is necessary to make the frame area as a so-called narrow frame.

A sealing material is formed in the frame area to bond the TFT substrate and the counter substrate. Further, an alignment film is formed in the display area of the liquid crystal display device to initially align the liquid crystal. Since the alignment film should completely cover the display area, the area coated with the alignment film should be made larger than the display area by a predetermined width. The alignment process of the alignment film includes a rubbing method and an optical alignment process (hereinafter also referred to as optical alignment). Patent Document 1 (Japanese Patent Application Laid-Open No. 2004-206091) describes a method that achieves: (1) reduce misalignment due to the complex multilayer structure of the pixel portion; and (2) prevent static electricity generated during rubbing, disturbance at the end of the rubbing cloth, and the influence of foreign materials or other contaminants caused by rubbing.

The so-called viewing angle is a problem for the liquid crystal display device. The in-plane switching (IPS) mode controls the amount of light passing through the liquid crystal layer by rotating the liquid crystal molecules in the direction parallel to the substrate, and has excellent characteristics for the viewing angle. At the same time, the IPS mode liquid crystal display device does not require the so-called pretilt angle, and for this reason, is suitable for the optical alignment.

In particular, in the alignment film that has been subjected to an optical alignment process according to a conventional example, the reliability of bonding with the sealing material could be impaired if the alignment film is present between the sealing material and the TFT substrate or between the sealing material and the counter substrate. For this reason, it has been necessary to strictly control the alignment film so that the coating end of the alignment film does not overlap the sealing material.

The alignment film is applied by printing, inkjet, or other printing methods. The alignment film material is liquid which is wet and spread on the surface, and it is difficult to control the coating end of the alignment film. Patent Document 2 (Japanese Patent Application Laid-Open No. 2011-145535) describes a configuration in which a second alignment film is formed in a frame-like shape on the outside of the alignment film formed in the display area, to control the coating region of the alignment film of the display area by the use of the second alignment film as a stopper of the alignment film formed in the display area.

The IPS mode liquid crystal display device has excellent viewing angle and its application has been expanding in various fields. Further, the IPS mode does not require the pretilt angle and is suitable for the optical alignment process. The optical alignment process of the alignment film is a method for irradiating the alignment film with polarized UV light of 300 nm or less, to allow the uniaxial anisotropy to occur in the alignment film. When UV light is irradiated on the alignment film, the polymer that forms the alignment film is separated by the UV light. As a result, the mechanical strength of the alignment film that has been subjected to the optical alignment process is reduced. At the same time, the bonding strength between the sealing material and the alignment film is also reduced.

Thus, in the conventional configuration, the alignment film that has been optically aligned is controlled so as not to overlap the sealing material, or even in the case in which the alignment film and the sealing material have to overlap, the alignment film is formed not to overlap the whole so that a portion of the alignment film does not overlap the sealing material.

FIGS. 14A, 14B, and 14C are views of the configuration when an alignment film 20 and a sealing material 30 do not overlap, in which FIG. 14A is a plan view and FIGS. 14B and 14C are cross-sectional views. FIG. 14A is a perspective plan view. A TFT substrate 100 and a counter substrate 200 are bonded by means of a peripheral sealing material 30. Then, the inside space between the two substrates is filled with a liquid crystal 250. The alignment film 20 is formed so as to cover a display area 10 and to extend to the outside of the display area 10. The sealing material 30 is formed on the outside of the alignment film 20. Note that the alignment film 20 has been subjected to an optical alignment process.

FIG. 14B is a cross-sectional view taken along line A-A of FIG. 14A. In FIG. 14B, the alignment film 20 does not overlap the sealing material 30. FIG. 14C is a cross-sectional view taken along line B-B of FIG. 14A. In FIG. 14C, the alignment film 20 does not overlap the sealing material 30. With this configuration, the bonding strength of the sealing portion is maintained sufficiently high.

However, there is also a type in which the narrower the frame, the more difficult it is to form the outer end portion of the alignment film 20 on the inside of the sealing material 30. FIGS. 15A, 15B, and 15C are views of the configuration in which the width of the frame is reduced in such a way that a portion in the width direction of the sealing material 30, namely, the side of the display area 10 overlaps the alignment film 20. FIG. 15A is a plan view. In FIG. 15A, the display area 10 is formed inside the sealing material 30, in which the inside in the width direction of the sealing material overlaps the alignment film 20.

FIG. 15B is a cross-sectional view taken along line A-A of FIG. 15A. In FIG. 15B, the alignment film 20 overlaps a portion of the sealing material 30. However, the alignment film 20 does not overlap the whole surface of the sealing material 30. In this way, the bonding strength with the sealing material 30 is maintained in the portion in which the alignment film 20 does not overlap the sealing material 30. FIG. 15C is a cross-sectional view taken along line B-B of FIG. 15A. In FIG. 15C, the alignment film 20 overlaps a portion of the sealing material 30. However, the alignment film 20 does not overlap the whole surface of the sealing material 30. In this way, the bonding strength of the sealing material 30 is maintained in the portion in which the alignment film 20 does not overlap the sealing material 30.

However, in order to achieve the configuration shown in FIGS. 14 and 15, it is necessary to accurately control the position of the ends of the four sides of the alignment film 20. Since the alignment film 20 is applied by flexographic printing, inkjet, or other printing methods, the control of the profile is not easy.

An object of the present invention is to achieve a liquid crystal display device in which the profile of the alignment film is easy to control, and at the same time, the reliability of the sealing portion is maintained.

SUMMARY OF THE INVENTION

The present invention has been made to overcome the above problems, and specific means for solving the problems are as follows.

(1) A liquid crystal display device formed by bonding a first substrate having a first alignment film and a second substrate having a second alignment film by means of a sealing material, in which a liquid crystal is interposed between the first substrate and the second substrate, wherein the first alignment film and the second alignment film have been subjected to an optical aliment process with UV light in a display area, wherein the first substrate has a first side, a second side opposite the first side, a third side, and a fourth side opposite the third side, wherein in the first side, a first area is present with a first width parallel to the first side in which the first alignment is not present, and in which the sealing material is formed in such a way that at least a portion of the sealing material overlaps the first area, wherein in the second side, a second area is present with a second width parallel to the second side in which the first alignment film is not present, and in which the sealing material is formed in such a way that at least a portion of the sealing material overlaps the second area, wherein in the third side, a third area is present parallel to the third side in which the birefringence phase difference (retardation) of the alignment film is one fourth or less of the birefringence phase difference (retardation) of the alignment film in the display area, and in which the width of the third area overlapping the sealing material is one fourth or more of the width of the sealing material in the third side, and wherein in the fourth side, a fourth area is present parallel to the fourth side in which the birefringence phase difference (retardation) of the alignment film is one fourth or less of the birefringence phase difference (retardation) of the alignment film in the display area, and in which the width of the fourth area overlapping the sealing material is one fourth or more of the width of the sealing material in the fourth side.

(2) The liquid crystal display device according to (1), wherein the second substrate has a first side, a second side opposite the first side, a third side, and a fourth side opposite the third side, wherein each of the first, second, third, and fourth sides of the first substrate corresponds to each of the first, second, third, and fourth sides of the second substrate, wherein in the first side of the second substrate, a first area is present with a first width parallel to the first side in which the first alignment is not present, and in which the sealing material is formed in such a way that at least a portion of the sealing material overlaps the first area, wherein in the second side of the second substrate, a second area is present with a second width parallel to the second side in which the first alignment film is not present, and in which the sealing material is formed in such a way that at least a portion of the sealing material overlaps the second area, wherein in the third side of the second substrate, a third area is present parallel to the third side in which the birefringence phase difference (retardation) of the alignment film is one fourth or less of the birefringence phase difference (retardation) of the alignment film in the display area, and in which the width of the third area overlapping the sealing material is one fourth or more of the width of the sealing material in the third side, and wherein in the fourth side of the second substrate, a fourth area is present parallel to the fourth side in which the birefringence phase difference (retardation) of the alignment film is one fourth or less of the birefringence phase difference (retardation) of the alignment film in the display area, and in which the width of the fourth area overlapping the sealing material is one fourth or more of the width of the sealing material in the fourth side.

(3) A liquid crystal display device formed by bonding a first substrate having a first alignment film and a second substrate having a second alignment film by means of a sealing s material, in which a liquid crystal is interposed between the first substrate and the second substrate, wherein the first alignment film and the second alignment film have been subjected to an optical alignment process with UV light in a display area, wherein the first substrate has a first side, a second side opposite the first side, a third side, and a fourth side opposite the third side, wherein the first alignment film is present overlapping the sealing material, wherein in the first side, a first area is present parallel to the first side in which the birefringence phase difference (retardation) of the alignment film is one fourth or less of the birefringence phase difference (retardation) of the alignment film in the display area, and in which the width of the first area overlapping the sealing material is one fourth or more of the width of the sealing material in the first side, and wherein in the second side, a second area is present parallel to the second side in which the birefringence phase difference (retardation) of the alignment film is one fourth or less of the birefringence phase difference (retardation) of the alignment film in the display area, and in which the width of the second area overlapping the sealing material is one fourth or more of the width of the sealing material in the second side.

(4) The liquid crystal display device according to (3), wherein the second substrate has a first side, a second side opposite the first side, a third side, and a fourth side opposite the third side, wherein each of the first, second, third, and fourth sides of the first substrate corresponds to each of the first, second, third, and fourth sides of the second substrate, wherein the second alignment film is present overlapping the sealing material, wherein in the first side of the second substrate, a first area is present parallel to the first side in which the birefringence phase difference (retardation) of the alignment film is one fourth or less of the birefringence phase difference (retardation) of the alignment film in the display area, and in which the width of the first area overlapping the sealing material is one fourth or more of the width of the sealing material in the first side, and wherein in the second side of the second substrate, a second area is present parallel to the second side in which the birefringence phase difference (retardation) of the alignment film is one fourth or less of the birefringence phase difference (retardation) of the alignment film in the display area, and in which the width of the second area overlapping the sealing material is one fourth or more of the width of the sealing material in the second side.

(5) A method of manufacturing a liquid crystal display device, the method comprising forming the liquid crystal display device by forming a large number of first substrates in a first mother substrate having a first alignment film, by forming a large number of second substrates in a second mother substrate having a second alignment film, by bonding the first and second mother substrates by means of a sealing material, and then by separating them from each other, wherein the method comprises the steps of: applying the first alignment film so as to form an area with a predetermined width, in which the alignment film is not present, in the boundary portion in a first direction of the first substrate of the first mother substrate; and an optical alignment process for performing optical alignment with UV light on the first alignment film of the first mother substrate, wherein in the step of the optical alignment process, the birefringence phase difference (retardation) of the alignment film in the boundary portion of the first substrate of the first mother substrate, which extends in a second direction orthogonal to the first direction, is one fourth or less of the birefringence phase difference (retardation) of the alignment film in the display area, and wherein the sealing material is formed overlapping at least a portion of the area in which the first alignment film is not present, and at the same time, the sealing material is formed overlapping the area in which the birefringence phase difference (retardation) of the first alignment film is one fourth or less of the birefringence phase difference (retardation) of the alignment film in the display area.

(6) The method of manufacturing a liquid crystal display device according to (5), wherein the method comprises the steps of: applying the second alignment film so as to from an area with a predetermined width, in which the alignment film is not present, in the boundary portion in a first direction of the second substrate of the second mother substrate; and an optical alignment process for performing optical alignment with UV light on the second alignment film of the second mother substrate, wherein in the step of the optical alignment process, the birefringence phase difference (retardation) of the alignment film in the boundary portion of the second substrate of the second mother substrate, which extends in a second direction orthogonal to the first direction, is one fourth or less of the birefringence phase difference (retardation) of the alignment film in the display area, and wherein the sealing material is formed overlapping at least a portion of the area in which the second alignment film is not present, and at the same time, the sealing material is formed overlapping the area in which the birefringence phase difference (retardation) of the second alignment film is one fourth or less of the birefringence phase difference (retardation) of the alignment film in the display area.

(7) The method of manufacturing a liquid crystal display device according to (5) or (6), wherein the alignment film is formed by flexographic printing, and wherein the printing direction by the printing roller of the flexographic printing is the first direction.

(8) A method of manufacturing a liquid crystal display device, the method comprising forming the liquid crystal display device by forming a large number of first substrates in a first mother substrate having a first alignment film, by forming a large number of second substrates in a second mother substrate having a second alignment film, by bonding the first and second mother substrates by means of a sealing material, and then by separating them from each other, wherein the method comprises the steps of: applying the first alignment film of the first mother substrate; and an optical alignment process for performing optical alignment with UV light on the first alignment film of the first mother substrate, wherein in the step of the optical alignment process, the amount of UV light irradiation in the boundary portion in a first direction of the first substrate of the first mother substrate is one fourth or less of the amount of UV light irradiation on the alignment film in the display area, and wherein the sealing material is formed overlapping the area in which the amount of UV light irradiation on the first alignment film is one fourth or less of the amount of UV light irradiation on the alignment film in the display area.

(9) The method of manufacturing a liquid crystal display device according to (8), wherein the method comprises the steps of: applying the second alignment film of the second mother substrate; and an optical alignment process for performing optical alignment with UV light on the second alignment film of the second mother substrate, wherein in the step of the optical alignment process, the amount of UV light irradiation in the boundary portion in the first direction of the second substrate of the second mother substrate is one fourth or less of the amount of UV light irradiation on the alignment film in the display area, and wherein the sealing material is formed overlapping the area in which the amount of UV light irradiation on the second alignment film is one fourth or less of the amount of UV light irradiation on the alignment film in the display area.

(10) A liquid crystal display device formed by bonding a first substrate having a first alignment film and a second substrate having a second alignment film by means of a sealing material, in which a liquid crystal is interposed between the first substrate and the second substrate, wherein the first alignment film and the second alignment film have been subjected to an optical alignment process with UV light in the display area, wherein the first substrate has a first side, a second side opposite the first side, a third side, and a fourth side opposite the third side, wherein in the first side, a first area is present with a first width parallel to the first side in which the first alignment is not present, and in which the sealing material is formed in such a way that at least a portion of the sealing material overlaps the first area, wherein in the second side, a second area is present with a second width parallel to the second side in which the first alignment film is not present, and in which the sealing material is formed in such a way that at least a portion of the sealing material overlaps the second area, wherein in the third side, a third area is present parallel to the third side in which the amount of UV light irradiation is one fourth or less of the amount of UV light irradiation on the alignment film in the display area, and in which the width of the third area overlapping the sealing material is one fourth or more of the width of the sealing material in the third side, and wherein in the fourth side, a fourth area is present parallel to the fourth side in which the amount of UV light irradiation is one fourth or less of UV light irradiation in the display area, and in which the width of the fourth area overlapping the sealing material is one fourth or more of the width of the sealing material in the fourth side.

(11) The liquid crystal display device according to (10), wherein the second substrate has a first side, a second side opposite the first side, a third side, and a fourth side third, and fourth sides of the first substrate corresponds to each of the first, second, third, and fourth sides of the second substrate, wherein in the first side of the second substrate, a first area is present with a first width parallel to the first side in which the first alignment film is not present, and in which the sealing material is present in such a way that at least a portion of the sealing material overlaps the first area, wherein in the second side of the second substrate, a second area is present with a second width parallel to the second side in which the first alignment film is not present, and in which the sealing material is formed in such a way that at least a portion of the sealing material overlaps the second area, wherein in the third side of the second substrate, a third area is present parallel to the third side in which the amount of UV light irradiation is one fourth or less of the amount of UV light irradiation on the alignment film in the display area, and in which the width of the third area overlapping the sealing material is one fourth or more of the width of the sealing material in the third side, wherein in the fourth side of the second substrate, a fourth area is present parallel to the fourth side in which the amount of UV light irradiation is one fourth or less of the amount of UV light irradiation on the alignment film in the display area, and in which the width of the fourth area overlapping the sealing material is one fourth or more of the width of the sealing material in the fourth side.

(12) A liquid crystal display device formed by bonding a first substrate having a first alignment film and a second substrate having a second alignment film by means of a sealing material, in which a liquid crystal is interposed between the first substrate and the second substrate, wherein the first alignment film and the second alignment film have been subjected to an optical alignment process with UV light in the display area, wherein the first substrate has a first side, a second side opposite the first side, a third side, and a fourth side opposite the third side, wherein the first alignment film is present overlapping the sealing material, wherein in the first side, a first area is present parallel to the first side in which the amount of UV light irradiation is one fourth or less of the amount of UV light irradiation on the alignment film in the display area, and in which the width of the first area overlapping the sealing material is one fourth or more of the width of the sealing material in the first side, wherein in the second side, a second area is present parallel to the second side, in which the amount of UV light irradiation is one fourth or less of the amount of UV light irradiation on the alignment film in the display area, and in which the width of the second area overlapping the sealing material is one fourth or more of the width of the sealing material in the second side.

(13) The liquid crystal display device according to (12) 12, wherein the second substrate has a first side, a second side opposite the first side, a third side, and a fourth side opposite the third side, wherein each of the first, second, third, and fourth sides of the first substrate corresponds to each of the first, second, third, and fourth sides of the second substrate, wherein the second alignment film is present overlapping the sealing material, wherein in the first side of the second substrate, a first area is present parallel to the first side in which the amount of UV light irradiation is one fourth or less of the amount of UV light irradiation on the alignment film in the display area, and in which the width of the first area overlapping the sealing material is one fourth or more of the width of the sealing material in the first side, and wherein in the second side of the second substrate, a second area is present parallel to the second side in which the amount of UV light irradiation is one fourth or less of the amount of UV light irradiation on the alignment film in the display area, and in which the width of the second area overlapping the sealing material is one fourth or more of the width of the sealing material in the second side.

(14) A method of manufacturing a liquid crystal display device, the method comprising forming the liquid crystal display device by forming a large number of first substrates in a first mother substrate having a first alignment film, by forming a large number of second substrates in a second mother substrate having a second alignment film, by bonding the first and second mother substrates by means of a sealing material, and then by separating them from each other, wherein the method comprises the steps of: applying the first alignment film with a predetermined width in the boundary portion in a first direction of the first substrate of the first mother substrate, so as to form an area in which the alignment film is not present; and an optical alignment process for performing optical alignment with UV light on the first alignment film of the first mother substrate, wherein in the step of the optical alignment process, the amount of UV light irradiation in the boundary portion of the first substrate of the first mother substrate, which extends in a second direction orthogonal to the first direction, is one fourth or less of the amount of UV light irradiation on the alignment film in the display area, and wherein the sealing material is formed in such a way that at least a portion of the sealing material overlaps the area in which the first alignment film is not present, and at the same time, the sealing material is formed overlapping the area in which the amount of UV light irradiation is one fourth or less of the amount of UV light irradiation on the alignment film in the display area.

(15) The method of manufacturing a liquid crystal display device according to (14), wherein the method comprises the steps of: applying the second alignment film with a predetermined width in the boundary portion in a first direction of the second substrate of the second mother substrate, so as to form an area in which the alignment film is not present; and an optical alignment process for performing optical alignment with UV light on the second alignment film of the second mother substrate, wherein in the step of the optical alignment process, the amount of UV light irradiation in the boundary portion of the second substrate of the second mother substrate, which extends in a second direction orthogonal to the first direction, is one fourth or less of the amount of UV light irradiation on the alignment film in the display area, and wherein the sealing material is formed in such a way that at least a portion of the sealing material overlaps the area in which the second alignment film is not present, and at the same time, the sealing material is formed overlapping the area in which the amount of UV light irradiation on the second alignment film is one fourth or less of the amount of UV light irradiation on the alignment film in the display area.

BRIEF DESCRIPTION OF THE DRAWINGS

FIGS. 1A, 1B and 1C are views of a liquid crystal display device according to a first embodiment of the present invention;

FIGS. 4A, 4B, and 4C are views of a liquid crystal display device, showing another configuration of the first embodiment;

FIGS. 13A, 13B, and 13C are views of a liquid crystal display device, showing another configuration of the second embodiment;

FIGS. 14A, 14B, and 14C are views of a liquid crystal display device in a conventional example;

FIGS. 15A, 15B, and 15C are views of another example of the liquid crystal display device in the conventional example.

DETAILED DESCRIPTION OF THE PREFERRED EMBODIMENTS

Figure 2:
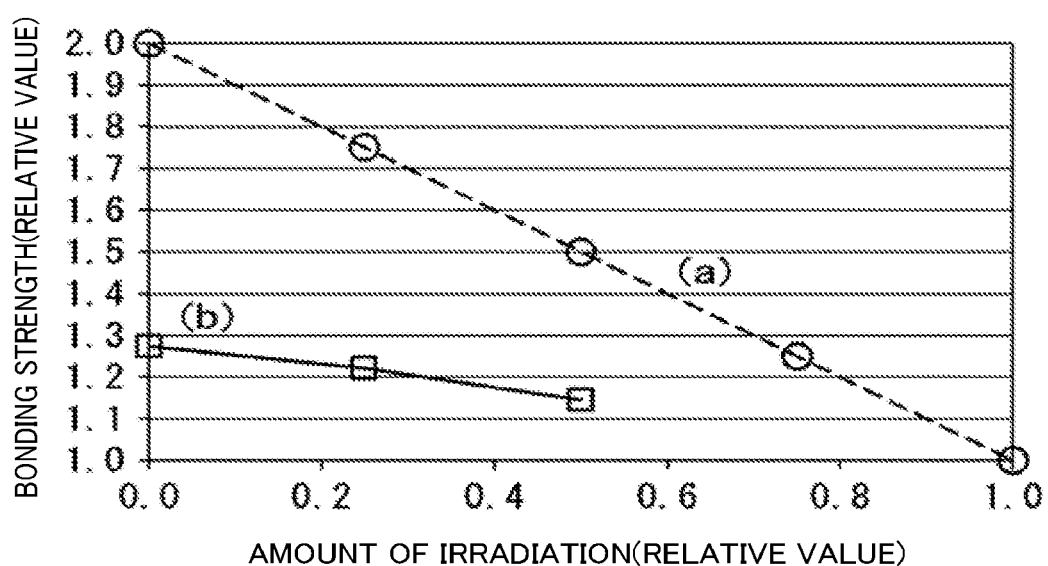
FIG. 2 is a graph showing the relationship between the amount of UV light irradiation on the alignment film and the bonding strength between the alignment film and the sealing material.

Hereinafter, the present invention will be described in detail with reference to the preferred embodiments.

First Embodiment

FIGS. 1A, 1B, and 1C are views of a liquid crystal display device according to a first embodiment of the present invention, in which FIG. 1A is a plan view. In FIG. 1A, a TFT substrate 100 and a counter substrate 200 are bonded by means of a sealing material 30. In FIG. 1A, an alignment film 20 has been subjected to an optical alignment process. On both sides of the short edges of either the TFT substrate 100 or the counter substrate 200 shown in FIG. 1A, there is an area 25 in which the alignment film 20 is not formed. In this case, as described below, a width L of the long edge of the alignment film 20 in FIG. 1A can be controlled relatively accurately. On both sides of the long edges in FIG. 1A, there is formed an area 21 in which the amount of UV light irradiation for performing optical alignment on the alignment film 20 is one fourth or less of the amount of UV light irradiation on the alignment film in the display area 10.

FIG. 1B is a cross-sectional view taken along line A-A of FIG. 1A. In FIG. 1B, the TFT substrate 100 and the counter substrate 200 are bonded by means of the sealing material 30. Further, a liquid crystal 250 is interposed between the TFT substrate 100 and the counter substrate 200. In FIG. 1B, a portion of the sealing material 30 overlaps the alignment film 20. The alignment film 20 has been subjected to the process of the optical alignment with polarized UV light (hereinafter, also simply referred to as UV light), so that the bonding strength with the sealing material 30 is small. However, the bonding strength of the sealing material 30 is maintained in the portion not overlapping the alignment film 20.

FIG. 1C is a cross-sectional view taken along line B-B of FIG. 1A. In FIG. 1C, the sealing material 30 overlaps the alignment film 20 and extends to the outside end portion. Of the area of the alignment film 20 overlapping the sealing material 30, the amount of UV light irradiation on the area 21 of a width w2 is one fourth or less of the amount of irradiation on the alignment film in the display area 10. Further, when the width of the sealing material 30 is w1, w2 is equal to or more than w1/4. In the area in which the width is w2, the amount of UV light irradiation is small, so that the reduction in the bonding strength between the alignment film 20 and the sealing material 30 can be minimized, and thus the reliability of the sealing portion is maintained.

FIG. 2 is a graph showing the relationship between the bonding strength between the alignment film 20 and the sealing material 30, and the amount of UV light irradiation for the optical alignment on the alignment film (hereinafter, simply referred to as the amount of UV light irradiation). In FIG. 2, the horizontal axis is the amount of UV light irradiation on the alignment film of the sealing portion, in which the amount of UV light irradiation on the alignment film in the display area is set to 1. The vertical axis is the bonding strength between the sealing material and the alignment film, in which the bonding strength between the alignment film with the irradiation of the amount of UV light with which the optical alignment characteristics are the highest, and the sealing material is set to 1. As shown in the curve (a) of FIG. 2, it can be found that the smaller the amount of UV light irradiation for the optical alignment, the more the adhesive property with the after-formed seal increases. For example, in the curve (a) of FIG. 2, when the alignment film is controlled not to be irradiated with UV light, the withstand load of the sealing material and the alignment film is increased up to twice the case of the amount of UV light irradiation with which the optical alignment characteristics are the highest. Further, even if the alignment film is not completely shielded from the light as descried above, but if the amount of UV light irradiation in the sealing portion can be reduced, the seal adhesive property increases according to the light shielding rate, and as a result, the reliability of the liquid crystal display device is increased.

The reduction of the amount of UV light irradiation on the sealing portion will contribute to the increase in the seal adhesive property, even if the reduction is done in a partial area of the sealing portion. The curve (b) of FIG. 2 is the result when the light is blocked by placing a light shielding mask with a thickness of 60 μm in an area of one fourth of the whole just above the alignment film of the sealing portion. In the curve (b), the amount of light irradiation on the alignment film portion, in which the seal is formed just below the light shielding mask, is one fourth of the amount of light irradiation in the case in which the light shielding mask is not present. As shown in the curve (b) of FIG. 2, when the amount of UV light irradiation in the one fourth area of the sealing portion is set to one fourth of the amount of UV light irradiation on the alignment film of the display area, it is possible to improve the bonding strength between the sealing material and the alignment film to 1.2 times, as compared to the case in which the sealing portion is not shielded from the light and is irradiated with the same amount of UV light as of the display area. Thus, according to the present invention, in the alignment film in the sealing portion, the width w2 that the area in which the amount of UV light irradiation is one fourth or less of the display area overlaps the sealing material, is set to one fourth or more of the width w1 of the sealing material. In this way, the bonding strength between the sealing material and the alignment film is maintained in the long edge.

Figure 3:
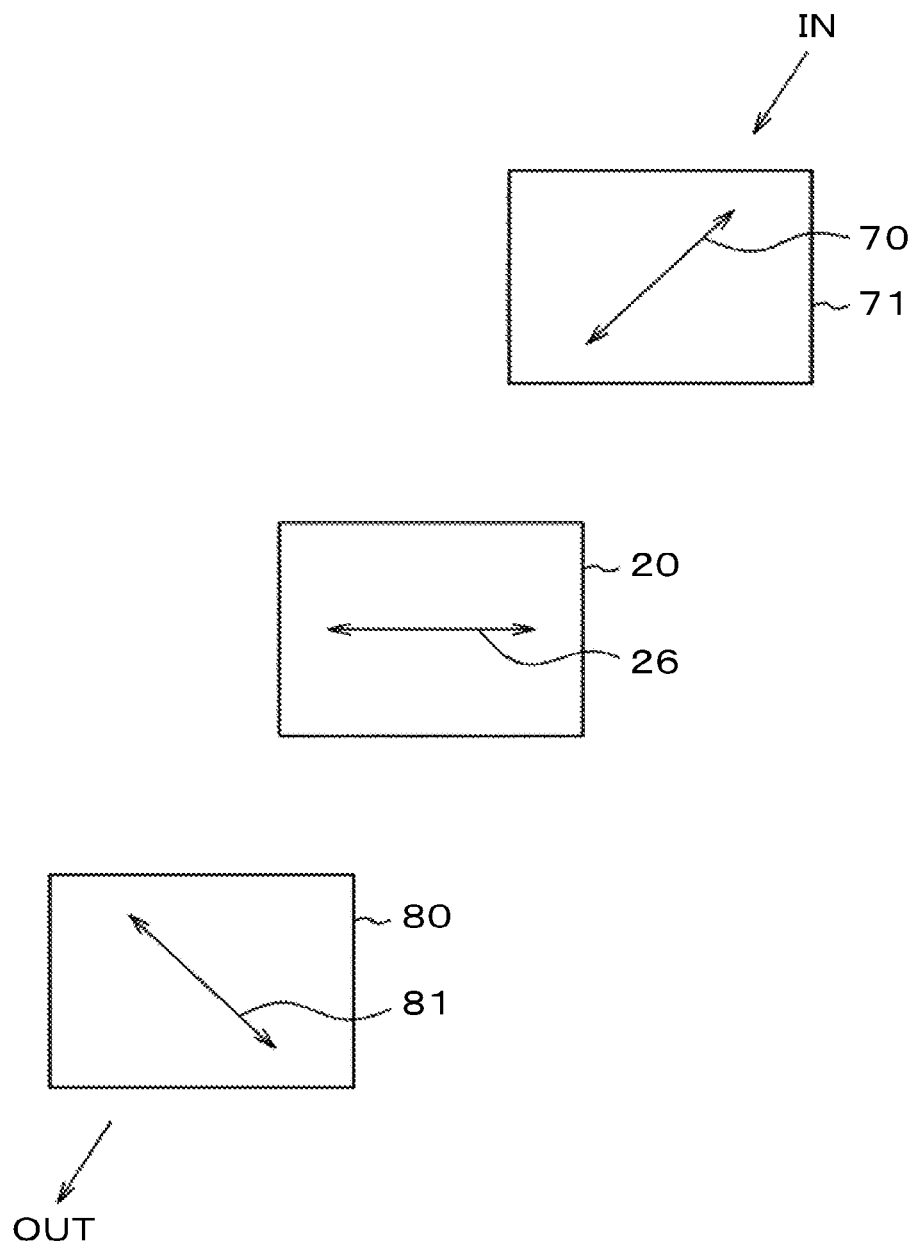
FIG. 3 is a system for evaluating the amount of irradiation of polarized UV light on the alignment film.

FIG. 3 is the evaluation method of the amount of UV light irradiation. The width of the alignment film portion in which the seal is formed is very narrow, so it is difficult to measure the amount of UV light irradiation with a normal intensity meter. For this reason, the amount of UV light irradiation is converted from the measurement value of the retardation of the alignment film. In FIG. 3, a first polarizing plate 70 with a polarization axis 71 of 45 degrees, the alignment film 20 in which the amount of irradiation of polarized UV light is evaluated, and a second polarizing plate 80 with a polarization axis of 135 degrees are aligned in the direction in which the light travels. The light IN that is incident to the first polarizing plate 70 is polarized in the 45 degree direction. If the alignment film 20 has not been subjected to the alignment process, the polarization direction of the light passing through the first polarizing plate 70 is not changed, so that the particular light is blocked by the second polarizing plate 80. Thus, the output light OUT in FIG. 3 is zero.

Figure 16:
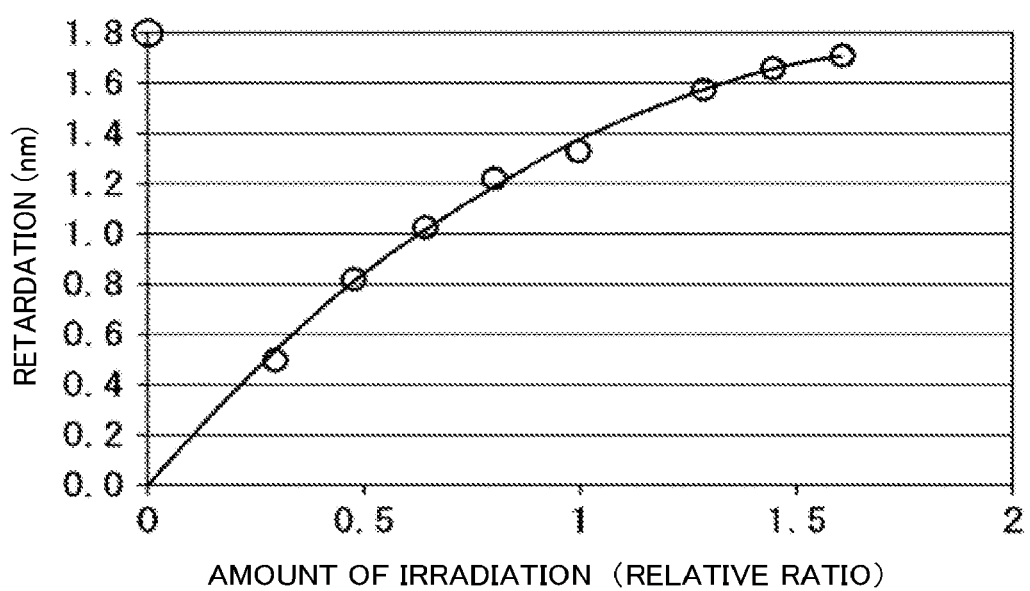
FIG. 16 is a graph showing the relationship between the retardation and the amount of UV light irradiation.

When the alignment process is performed by irradiation of polarized UV light on the alignment film 20 so that the alignment film 20 has an alignment axis 26 as indicated by the arrow, the polarization state of the light passing through the first polarizing plate 70 is changed because of the passage through the alignment film 20. As a result, a portion of the input light IN can pass through the second polarizing plate 80. Then, by increasing the amount of UV light irradiation on the alignment film 20, the change in the polarization state of the light passing through the first polarizing plate 70 is increased, and as a result, the amount of light passing through the second polarizing plate 80 is increased. The strength of the alignment of the alignment film 20 increases in proportion to the amount of irradiation of polarized UV light. Thus, it is possible to evaluate the amount of UV light irradiation on the alignment film 20 by measuring the amount of light passing through the second polarizing plate 80. FIG. 16 shows the relationship between the amount of UV light irradiation on the alignment film and the retardation. From FIG. 16, it is found that when the retardation of the alignment film is measured and, for example, if the value is reduced from 1.33 to 0.50, the amount of irradiation in this place is reduced from 1.0 to 0.33. Note that the absolute value of the retardation varies according to the type and thickness of the used alignment film, so that it is necessary to evaluate the relationship in advance. However, the relative change rates of the retardation with respect to the amount of irradiation are often the same. From this fact, when the area in which the amount of irradiation is significantly reduced is formed as in the present invention, it is possible to determine that the amount of irradiation is also reduced to one fourth or less when the measurement value of the retardation is one fourth the original value.

FIGS. 4A, 4B, and 4C are another aspect of the first embodiment. FIG. 4A is a plan view. FIG. 4A is different from FIG. 1A in that the area in which the alignment film 20 is not present is located on the side of the long edge of either the TFT substrate 100 or the counter substrate 200, and that the area in which the amount of UV light irradiation on the alignment film 20 is small is located on the side of the short edge of either the TFT substrate 100 or the counter substrate 200. In FIG. 4A, the alignment film 20 has been subjected to the optical alignment process. On both sides of the long edges of either the TFT substrate 100 or the counter substrate 200, there is an area in which the alignment film 20 is not formed. In this case, the width of a short edge S of the alignment film 20 in FIG. 4A can be controlled relatively accurately as described below. On both sides of the short edges of either the TFT substrate 100 or the counter substrate 200 in FIG. 4A, the area 21 is present in which the amount of UV light irradiation for the optical alignment on the alignment film 20 is one fourth or less of the display area 10.

FIG. 4B is a cross-sectional view taken along line A-A of FIG. 4A. In FIG. 4B, the sealing material 30 overlaps the alignment film 20 and extends to the outside end portion. Of the area of the alignment film 20 overlapping the sealing material 30, the amount of UV light irradiation on the area 21 of the width w2 is one fourth or less of the display area 10. Further, when the width of the sealing material 30 is w1, w2 is equal to or more than w1/4. In the area in which the width is w2, the amount of UV light irradiation is small, so that the reduction in the bonding strength between the alignment film 20 and the sealing material 30 can be minimized, and thus the reliability of the sealing portion is maintained.

FIG. 4C is a cross-sectional view taken along line B-B of FIG. 4A. In FIG. 4C, a portion of the sealing material 30 overlaps the alignment film 20. The alignment film 20 has been subjected to the process of the optical alignment with polarized UV light, in which the bonding strength with the sealing material 30 is small. However, the bonding strength with the sealing material 30 is maintained in the portion in which the sealing material 30 does not overlap the alignment film 20.

Figure 5:
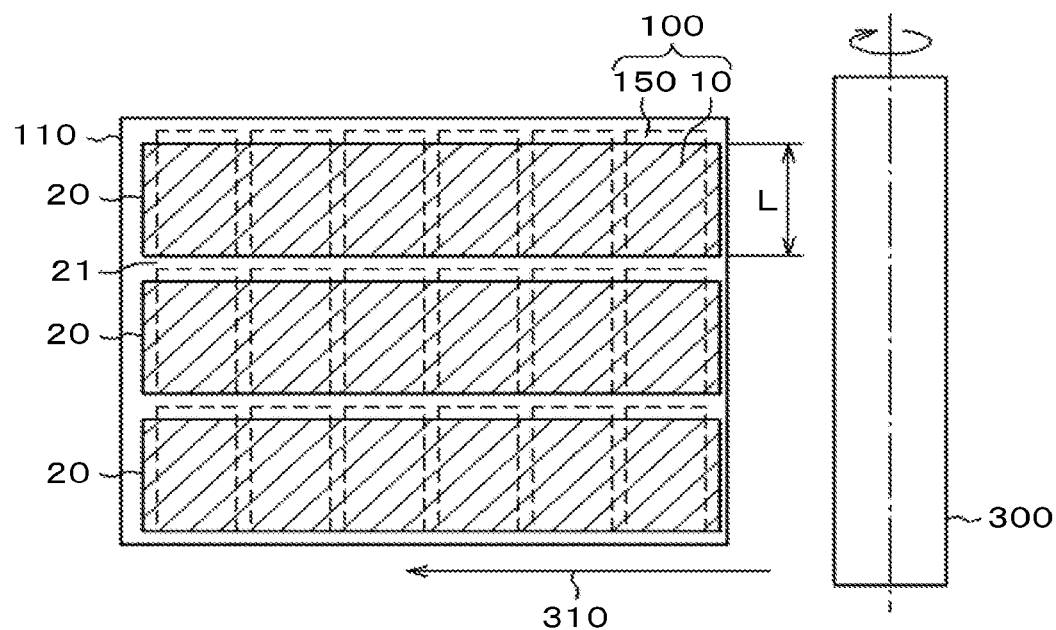
FIG. 5 is a schematic view of an alignment film application method according to the present invention.

FIG. 5 is a schematic view when the alignment film 20 is formed by flexographic printing according to the present invention. Each liquid crystal display panel is formed in such a way that a large number of liquid crystal display panels are formed in a mother board and are separated by scribing or other suitable method. The mother substrate is formed by bonding a mother TFT substrate in which a large number of TFT substrates are formed, and a mother counter substrate in which a large number of counter substrates are formed. FIG. 5 shows the state in which 18 TFT substrates 100 are formed in a mother TFT substrate 110. The dashed line corresponds to one TFT substrate 100. The TFT substrate 100 is formed with a display area 10 and a terminal portion 150. In flexographic printing, the alignment film 20 is formed by transferring the alignment film material, which is applied and formed on a printing roller 300, to the mother TFT substrate.

An arrow 310 indicates the travelling direction of the rolling printing roller. The alignment film 20 is printed in a stripe pattern as shown in FIG. 5, instead of being applied on the whole surface of the mother TFT substrate. In FIG. 5, the area 21 in which the alignment film 20 is not present corresponds to the area 21 in which the alignment film is not present on the side of the short edge of the TFT substrate 100 in FIG. 1. The advantage of the present invention is that it is possible to form the area 21 in which the alignment film is not present by rolling the printing roller 300 as in the case of the conventional method.

Further, the dimensions of the area 21 in which the alignment film is not present should be determined accurately. The printing pattern by the printing roller 300 in the travelling direction of the printing roller 300 is affected by the stretch or other deformation of the printing plate. For this reason, it is difficult to control the dimensions of the applied alignment film. In contrast, the dimensions in the direction orthogonal to the printing roller 300, namely, the dimensions in the axis direction of the printing roller can be controlled accurately. The present invention aims to accurately control the L dimension of FIG. 1 in either the TFT substrate 100 or the counter substrate 200, by setting the direction of the L dimension to the axis direction of the printing roller.

In contrast, the alignment film 20 is formed on the whole surface in the direction in which the stripe of the alignment film extends in FIG. 5, namely, on the long edge of the either the TFT substrate 100 or the counter substrate 200 in FIG. 1. Thus, if this portion is optically aligned with polarized UV light as it is in the display area 10, the bonding strength between the alignment film 20 and the sealing material 30 is reduced. Thus, in the present invention, the bonding strength on the long edge side of either the TFT substrate 100 or the counter substrate 200 is maintained in such a way that the amount of UV light irradiation on the alignment film 20 formed in the long edge portion of the either TFT substrate 100 or the counter substrate 200 in FIG. 1 is set to one fourth or less of the amount of UV light irradiation on the alignment film in the display area 10.

Figure 6:
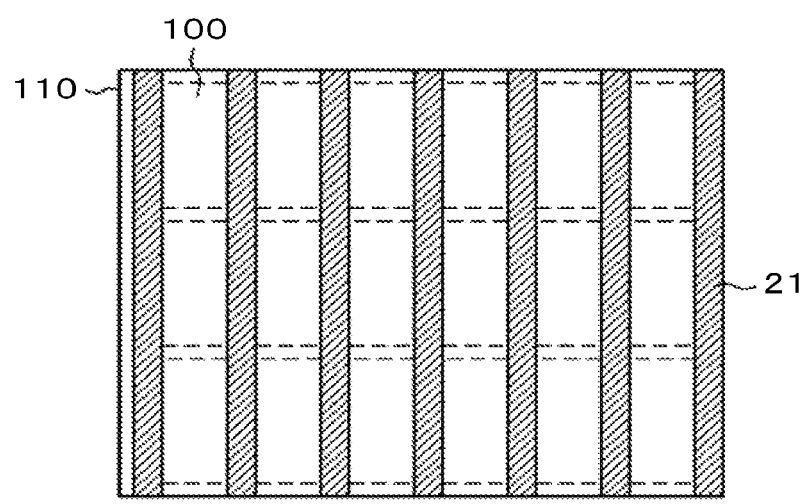
FIG. 6 is a plan view of a UV light irradiation pattern according to the present invention.

When the area in which the amount of UV light irradiation is reduced is formed, as shown in FIG. 6, a mask is provided in the portion corresponding to the long edge boundary portion of each TFT substrate 100 when the area is irradiated with UV light. In FIG. 6, the area 21 with a small amount of UV light irradiation is the stripe-like area shown by hatching.

Figure 7:
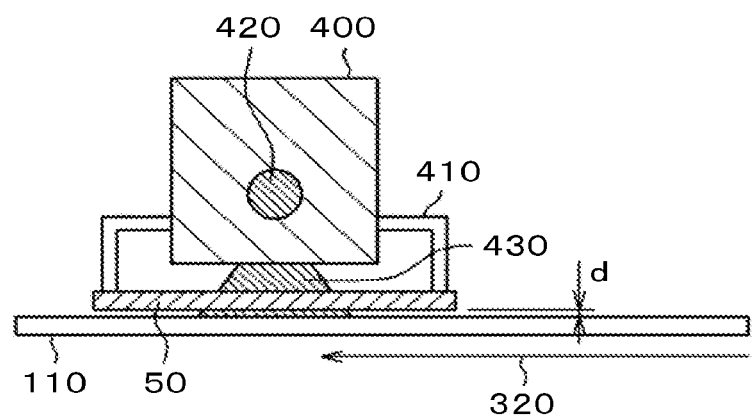
FIG. 7 is a cross-sectional view showing the UV light irradiation method according to the present invention.

FIG. 7 is a cross-sectional view showing the step of the UV light irradiation for the optical alignment of the mother TFT substrate 110 while forming the area in which the amount of UV light irradiation is small. In FIG. 7, a mask 50 is provided below an exposure unit 400 having a light source 420 in order to form the area with a small amount of UV light irradiation. The exposure unit 400 is fixed by a fixed base 410. Upon movement of the mother TFT substrate 110 below the mask 50, the mother TFT substrate 110 is exposed by an exposure light 430. In the present invention, it is possible to expose the mother TFT 110 while scanning it. Thus, it is possible to reduce the process time.

Further, the used mask 50 can have rough dimensions with a width of several mm in the light shielding portion. Thus, the distance d between the mask 50 and the substrate 110 can be set to about 1 mm, which also contributes to making the scanning of the substrate 110 easy.

Figure 8:
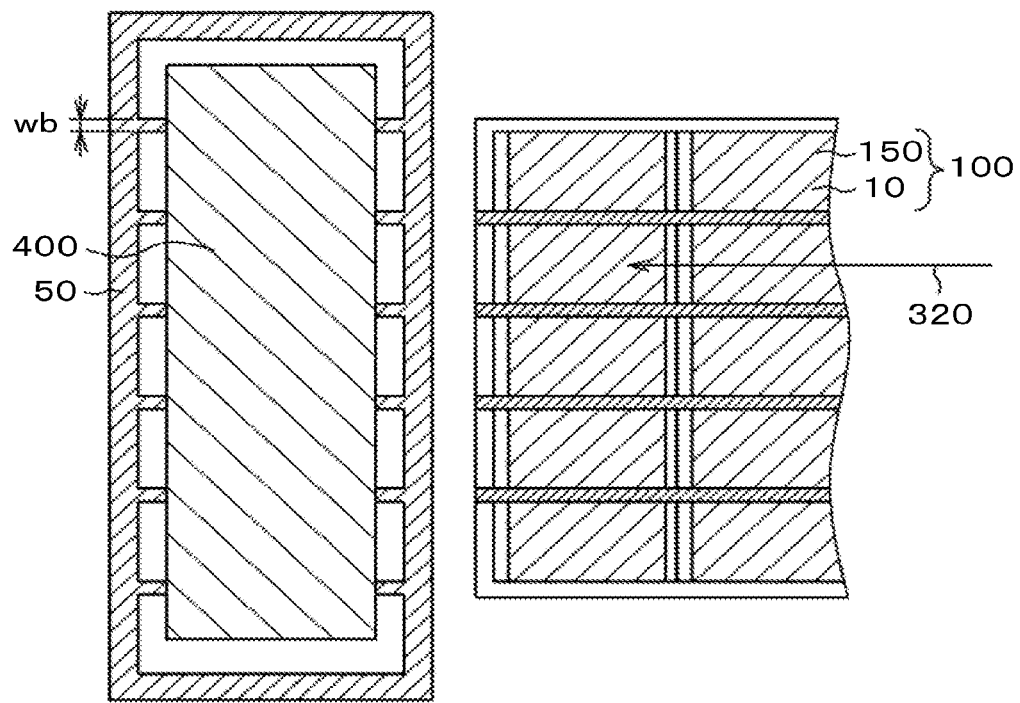
FIG. 8 is a plan view showing the UV light irradiation method according to the present invention.

FIG. 8 is a plan view showing the step of the UV light irradiation for optical alignment according to the present invention. In FIG. 8, the mask 50 is provided below the exposure unit 400 in order to form the area with a small amount of UV light irradiation. The bridge portion of the mask 50 of FIG. 8 is the mask area for forming the area with a small amount of UV light irradiation on the alignment film, in which the width wb is of millimeter order. In FIG. 8, the mother TFT substrate 110 in which the alignment film 20 is printed is scanned in the direction of an arrow 320 below the mask, while the optical alignment is performed by UV light irradiation.

The area with less UV light irradiation is the boundary portion of the TFT substrate 100, which is shown in the mother TFT substrate 110 of FIG. 8. This portion corresponds to the bridge portion of the mask 50. In other words, the area with less UV light irradiation is formed at the same time as the optical alignment process on the display area 10 of the TFT substrate 100. In the mother TFT substrate 110 of FIG. 8, the portion in which the alignment film is not present is formed in a stripe pattern in the direction orthogonal to the scanning direction of the mother TFT substrate 110. This portion corresponds to the area 21 in which the alignment film is not present on the short edge side of the TFT substrate 100 in FIG. 1.

Figure 9:
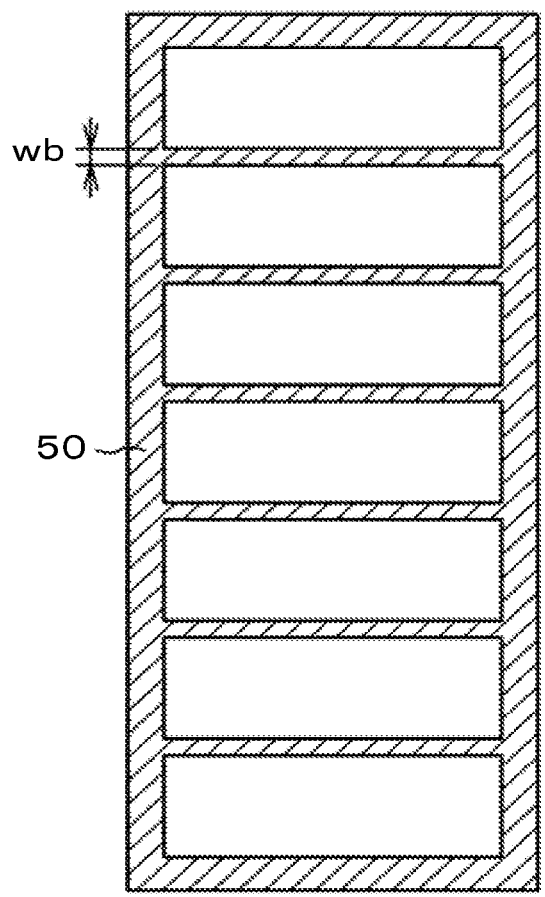
FIG. 9 is an example of the UV light irradiation mask used in the present invention.

FIG. 9 is a plan view of an example of the mask 50. In FIG. 9, the bridge portion forms the area with less UV light irradiation. Such a mask 50 can be formed, for example, by pressing or etching a thin metal plate. Since the width wb of the bridge is of millimeter order, a high level of control of dimensions is not required.

Figure 10:
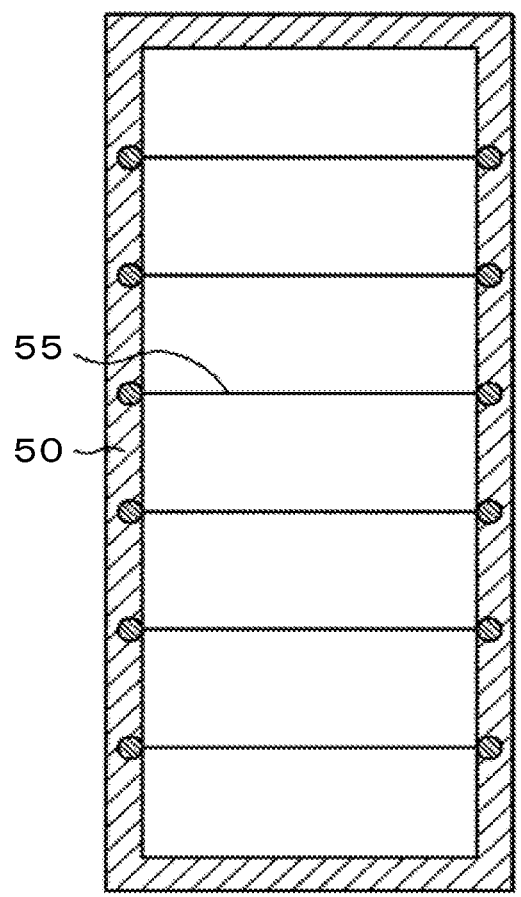
FIG. 10 is another example of the UV light irradiation mask used in the present invention.

FIG. 10 is a plan view of another example of the mask 50. The mask 50 used in the present invention is not required to completely block UV light, in which the intensity of the UV light can be reduced to one fourth of the intensity in the display area. For this reason, the penetration of the UV light into the interior is allowed. Thus, the mask 50 can be produced with cost as the main priority. The mask used for forming the area with less UV light irradiation in FIG. 10 is formed by a wire 55. The wire 55 can be, for example, a guitar string or other thin wire. The advantage of FIG. 10 is that the mask can be applied to a product of different size of the TFT substrate 100 in the mother TFT substrate 110 only by moving the position of the wire 55, so that there is no need to produce the mask for each type of product.

Figure 11:
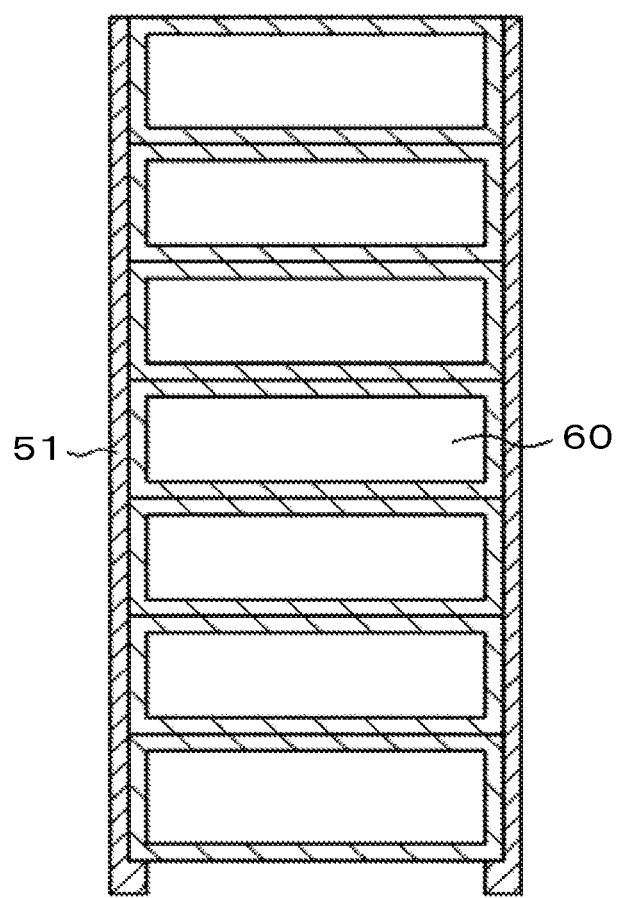
FIG. 11 is still another example of the UV light irradiation mask used in the present invention.

FIG. 11 is a plan view of still another example of the mask 50 used in the present invention. For the general photomask, silica glass is used to reduce the thermal expansion. However, the silica glass is not suitable for the production of large mask. In FIG. 10, small pieces of silica glass 60 are combined in a plane within a mask frame 51. In other words, in the present invention, the silica glass 60 can also be used as the mask if needed.

In the above description, the process of alignment film application and the process of UV light irradiation are assumed to be performed mainly on the mother TFT substrate. However, these processes are the same for the case of the mother counter substrate. Further, in the above description, the alignment film printing pattern, the UV light irradiation pattern, and the like have been described in connection with FIG. 1. However, these patterns are the same for the case of FIG. 4. In other words, the pattern of the counter TFT substrate in the mother TFT substrate, or the pattern of the counter substrate in the mother counter substrate can be applied to FIG. 4 under the assumption that the used pattern is rotated by 90 degrees relative to FIG. 1.

Second Embodiment

Figure 12A:
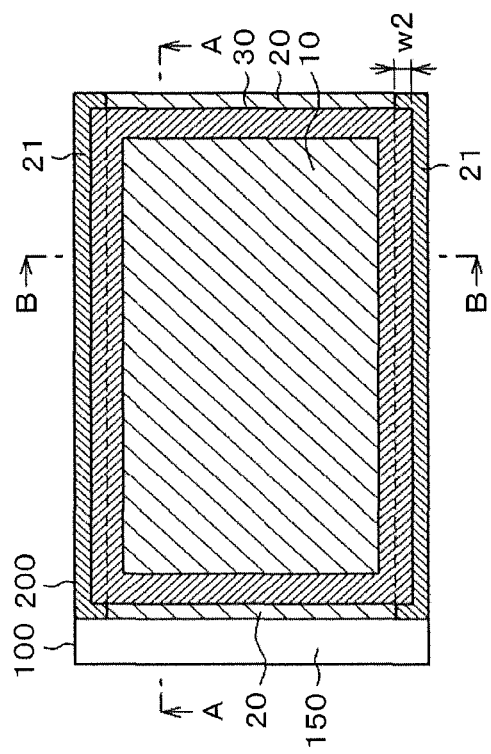
FIGS. 12A, 12B, and 12C are views of a liquid crystal display device according to a second embodiment of the present invention.
Figure 12C:
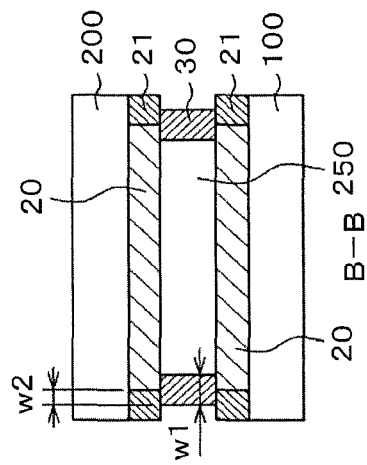
Figure 12B:
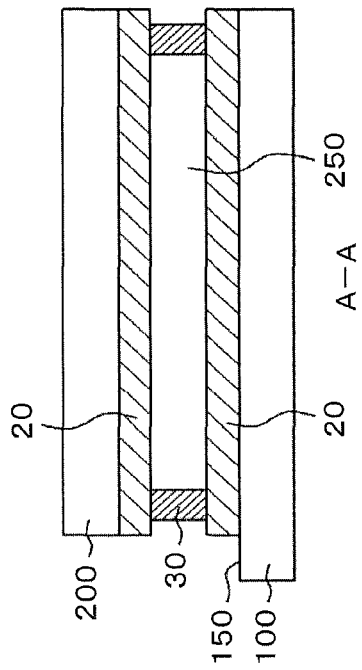

FIGS. 12A, 12B, and 12C are views of a liquid crystal display device showing a second embodiment of the present invention, in which FIG. 12A is a plan view. In FIG. 12A, the TFT substrate 100 and the counter substrate 200 are bonded by means of the sealing material 30. The alignment film 20 is formed on the whole surface of the counter substrate 200. Then, the alignment film 20 is formed on the whole surface of the TFT substrate 100 except the terminal portion 150. The alignment film 20 has been subjected to the process of the optical alignment with UV light. In FIG. 12A, the amount of UV light irradiation on the hatched portion 21 on the long edge side of either the TFT substrate 100 or the counter substrate 200 is one fourth or less of the amount of UV light irradiation on the alignment film in the display area. Thus, the bonding strength between the sealing material 30 and the alignment film 20 in this portion is stronger than the bonding strength in the other parts.

FIG. 12B is a cross-sectional view taken along line A-A of FIG. 12A. In FIG. 12B, the TFT substrate 100 and the counter substrate 200 are bonded by means of the sealing material 30. Then, a liquid crystal layer 250 is interposed between the TFT substrate 100 and the counter substrate 200. The alignment film 20 is formed on the whole surface on both sides of the TFT substrate 100 and the counter substrate 200. The alignment film 20 has been subjected to the process of the optical alignment with UV light.

FIG. 12C is a cross-sectional view taken along line B-B of FIG. 12A. In FIG. 12C, the TFT substrate 100 and the counter substrate 200 are bonded by means of the sealing material 30. Then, the liquid crystal layer 250 is interposed between the TFT substrate 100 and the counter substrate 200. The width of the sealing material 30 is w1. In FIG. 12C, the alignment film 20 is formed on the whole surfaces of the TFT substrate 100 and the counter substrate 200. The alignment film 20 was irradiated with polarized UV light for the optical alignment. However, the amount of UV light irradiation on the hatched end area 21 of the alignment film is one fourth or less, as compared to the amount of UV light irradiation on the alignment film in the display area. Then, this portion overlaps the sealing material 30 along the width w2, so that the bonding strength with the sealing portion can be maintained in this portion, and thus the reliability of the alignment film 20 can be maintained. In this case, w2 is equal to or more than w1/4. In the present embodiment, the method for forming the area 21 in which the exposure amount of UV light is one fourth or less of the exposure amount in the display area, is the same as the method described in the first embodiment.

In FIG. 12B, the sealing material 30 is bonded to the alignment film 20 that has been subjected to the UV light irradiation in the same manner as in the display area 10. Thus, the bonding strength is relatively weak as compared to the case without the irradiation of UV light. However, in the present embodiment, the area 21 in which the exposure amount of UV light is one fourth or less of the exposure amount in the display area is formed in the cross-section shown in FIG. 12C, namely, on the long edge side in FIG. 12A. In this way, the bonding strength between the sealing material 30 and the alignment film 20 is increased, and thus the reliability is maintained.

FIGS. 13A, 13B, and 13C are views of the liquid crystal display device showing another aspect of the second embodiment of the present invention, in which FIG. 13A is a plan view. In FIG. 13A, the TFT substrate 100 and the counter substrate 200 are bonded by means of the sealing material 30. The alignment film 20 is formed on the whole surface of the counter substrate 200. Then, the alignment film 20 is formed on the whole surface of the TFT substrate 100 except the terminal portion 150. The alignment film 20 has been subjected to the process of the optical alignment with UV light. In FIG. 13A, the amount of UV light irradiation on the hatched area 21 on the short edge side of either the TFT substrate 100 or the counter substrate 200 is one fourth or less of the amount of UV light irradiation on the alignment film in the display area 10. For this reason, the bonding strength between the sealing material 30 and the alignment film 20 in this portion is relatively strong as compared to the other parts.

FIG. 13B is a cross-sectional view taken along line A-A of FIG. 13A. In FIG. 13B, the TFT substrate 100 and the counter substrate 200 are bonded by means of the sealing material 30. Then, the liquid crystal layer 250 is interposed between the TFT substrate 100 and the counter substrate 200. The width of the sealing material 30 is w1. In FIG. 13B, the alignment film 20 is formed on the whole surfaces of the TFT substrate 100 and the counter substrate 200. The alignment film 20 was irradiated with polarized UV light for the optical alignment. However, the amount of UV light irradiation on the hatched end area 21 of the alignment film is one fourth or less as compared to the amount of UV light irradiation on the alignment film in the display area. Then, this portion overlaps the sealing material 30 along the width w2, so that the bonding strength of the sealing portion can be maintained in this portion. As a result, it is possible to maintain the relatability. In this case, w2 is equal to or more than w1/4. In the present embodiment, the method for forming the area in which the exposure amount of UV light is one fourth or less of the exposure amount in the display area is the same as the method described in the first embodiment.

FIG. 13C is a cross-sectional view taken along line B-B of FIG. 13A. In FIG. 13C, the alignment film is formed on the whole surfaces of the TFT substrate 100 and the counter substrate 200. The alignment film 20 has been subjected to the process of the optical alignment with UV light. Thus, in FIG. 13C, the sealing material 30 is bonded to the alignment film 20 that has been subjected to the UV light irradiation in the same manner as in the display area 10. Thus, the bonding strength is relatively weak as compared to the case without the irradiation of UV light. However, in the present embodiment, the area 21 in which the exposure amount of UV light is one fourth or less of the exposure amount in the display area 10 is formed in the cross-section shown in FIG. 13B, namely, on the short edge side in FIG. 13A. In this way, the bonding strength between the sealing material 30 and the alignment film 20 is increased, and thus the reliability is maintained.

As described above, according to the second embodiment, the alignment film 20 can be applied on the whole surface of the counter substrate 200 as well as on the whole surface of the TFT substrate 100 except the terminal portion 150. Thus, there is no need to highly control the application dimensions of the alignment film 20, so that the productivity is excellent. Further, the area 21 in which the amount of UV light irradiation on the end portion on the short edge side or on the long edge side of either the TFT substrate 100 or the counter substrate 200 is one fourth of the display area, in order to maintain the bonding strength between the sealing material 30 and the alignment film 20. As a result, the reliability of the sealing portion can also be maintained.

The above description assumes that the application of the alignment film is carried out by flexographic printing. However, the present invention can also be applied to the case in which the alignment film application is carried out by other application methods, for example, an inkjet method. Further, if the present invention is applied to only one of the TFT substrate or the counter substrate due to process constraints or other reasons, it is possible to obtain a certain effect.

What is claimed is:

1. A liquid crystal display device comprising:
   a first substrate having a pixel and a first alignment film,
   a second substrate having a color filter and a second alignment film,
   a sealing material and a liquid crystal interposed between the first substrate and the second substrate,
   wherein the first alignment film and the second alignment film are optical alignment films,
   wherein the first substrate has a first edge, a second edge opposite the first edge, a third edge, and a fourth edge opposite the third edge, the first edge and the second edge extend in a first direction, the third edge and the fourth edge extend in a second direction intersecting with the first direction, and an outer shape of the first substrate is formed by first to fourth edges, wherein the first substrate comprises:

a first area, formed between the first edge and a display area where pixels are formed, has a first width in the second direction, and extends in the first direction, the first alignment film is not formed in the first area, a first portion of the sealing material overlaps the first area, and a second portion of the sealing material overlaps the first alignment film between the display area and the first area, a second area formed between the second edge and the display area, the second area has a second width in the second direction, and extends in the first direction, the first alignment film is not formed in the second area, a third portion of the sealing material overlaps the second area, and the fourth portion of the sealing material overlaps the first alignment film between the display area and the second area, a third area formed between the third edge and the display area, extends in the second direction, the third area overlaps the first alignment film, a first birefringence phase difference (retardation) of the first alignment film in the third area is one fourth or less of a second birefringence phase difference (retardation) of the first alignment film in the display area, and a width of the third area in the first direction overlapping the sealing material is one fourth or more of a width of the sealing material in the first direction between the display area and the third edge in the first direction, and a fourth area, formed between the fourth edge and the display area, extends in the second direction, the fourth area overlaps the first alignment film, the first birefringence phase difference (retardation) of the first alignment film in the fourth area is one fourth or less of the second birefringence phase difference (retardation) of the first alignment film in the display area, and a width of the fourth area in the first direction overlapping the sealing material is one fourth or more of a width of the sealing material in the first direction between the display area and the fourth edge in the first direction.

2. The display device according to claim 1, wherein the sealing material includes a fifth portion, a sixth portion, a seventh portion, and an eighth portion, the fifth portion, the sixth portion, the seventh portion, and the eighth portion overlap the first alignment film, the fifth portion and the sixth portion are located between the display area and the third edge, the seventh portion and the eight portion are located between the display area and the fourth edge, the fifth portion overlaps with the third area, the sixth portion does not overlap with the third area, the seventh portion overlaps with the fourth area, and the eighth portion does not overlap with the fourth portion.

3. The display device according to claim 2, wherein the first alignment film has a fifth area overlapping the second portion of the sealing material, the fifth area of the first alignment film has the second birefringence phase difference (retardation).

4. The display device according to claim 3, wherein the first alignment film has a sixth area overlapping the fourth portion of the sealing material, the sixth area of the first alignment film has the second birefringence phase difference (retardation).

5. The display device according to claim 4, wherein the first alignment film has a seventh area overlapping the sixth portion of the sealing material, the seventh area of the first alignment film has the second birefringence phase difference (retardation).

6. The display device according to claim 5, wherein the first alignment film has an eighth area overlapping the eighth portion of the sealing material, the eighth area of the first alignment film has the second birefringence phase difference (retardation).

7. The display device according to claim 6, wherein the outer shape of the first substrate is rectangle shape formed by a pair of long edges and a pair of short edges, the first edge and the second edge correspond to the long edges, and the third edge and the fourth edge correspond to the short edges.

8. The display device according to claim 7, wherein the first substrate includes a terminal portion, the terminal portion does not overlap with the second substrate, the third area of the first alignment film is located between the fourth area of the first alignment film and the terminal portion.

9. The display device according to claim 6, wherein the outer shape of the first substrate is rectangle shape formed by a pair of long edges and a pair of a short edges, the first edge and the second edge correspond to the short edges, and the third edge and the fourth edge correspond to the long edges.

10. The display device according to the claim 9, wherein the first substrate includes a terminal portion, the terminal portion does not overlap with the second substrate, the first area of the first alignment film is located between the second area of the first alignment film and the terminal portion.

* * * * *